United States Patent
McGee et al.

(10) Patent No.: US 9,990,501 B2
(45) Date of Patent: Jun. 5, 2018

(54) DIAGNOSING AND TRACKING PRODUCT VULNERABILITIES FOR TELECOMMUNICATION DEVICES VIA A DATABASE

(71) Applicant: Alcatel-Lucent USA Inc., Murray Hill, NJ (US)

(72) Inventors: Andrew R. McGee, Toms River, NJ (US); Fabio Jaramillo, Bloomfield, NJ (US); Kirtan Shah, Newark, NJ (US); Keith W. Johnson, Denver, CO (US); Marc Verbruggen, Mortsel (BE); Donald McBride, Naperville, IL (US); Rao Vasireddy, Holmdel, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 0 days. days.

(21) Appl. No.: 14/748,756

(22) Filed: Jun. 24, 2015

(65) Prior Publication Data
US 2016/0378993 A1    Dec. 29, 2016

(51) Int. Cl.
G06F 21/57 (2013.01)
H04L 29/06 (2006.01)
G06F 17/30 (2006.01)

(52) U.S. Cl.
CPC ........ G06F 21/577 (2013.01); G06F 17/3053 (2013.01); H04L 63/1433 (2013.01); G06F 2221/034 (2013.01)

(58) Field of Classification Search
CPC ... H04L 29/06; G06F 21/577; G06F 17/3053; G06F 2221/034

USPC ........................................................ 726/25
See application file for complete search history.

(56) References Cited

U.S. PATENT DOCUMENTS

| | | | |
|---|---|---|---|
| 7,949,191 B1* | 5/2011 | Ramkumar | G06K 9/723 382/190 |
| 8,201,257 B1 | 6/2012 | Andres et al. | |
| 8,458,118 B1* | 6/2013 | Hale | H04L 41/0809 707/603 |
| 2003/0212909 A1* | 11/2003 | Chandrashekhar | H04L 63/1433 726/25 |
| 2005/0005152 A1* | 1/2005 | Singh | G06F 21/577 726/26 |

(Continued)

FOREIGN PATENT DOCUMENTS

EP    1768044 A2    3/2007

*Primary Examiner* — Haresh N Patel
(74) *Attorney, Agent, or Firm* — Duft Bornsen & Fettig, LLP

(57) ABSTRACT

Systems and methods for tracking telecom computing device vulnerabilities. The system includes a database storing a plurality of entries that describe security vulnerabilities, and a controller that receives input from a user selecting a class of telecommunication devices, e.g. a product line, and searches the database to identify pertinent entries describing a relevant security vulnerability for the class. The controller also identifies an authoritative entry that describes the relevant security vulnerability, validates pertinent entries within the database that conform with the authoritative entry, generates a report indicating a severity of the security vulnerability within the class based on valid entries within the database, and assesses a severity of the relevant security vulnerability for the class based on the conforming entries.

17 Claims, 5 Drawing Sheets

(56) References Cited

U.S. PATENT DOCUMENTS

| | | | |
|---|---|---|---|
| 2006/0168121 A1* | 7/2006 | Rubinstein | G06F 17/30011 709/219 |
| 2007/0067845 A1* | 3/2007 | Wiemer | G06F 21/577 726/25 |
| 2007/0067846 A1* | 3/2007 | McFarlane | H04L 63/1433 726/25 |
| 2007/0067847 A1* | 3/2007 | Wiemer | H04L 63/1433 726/25 |
| 2008/0208882 A1* | 8/2008 | Zhang | G06F 17/30303 707/999.101 |
| 2010/0095235 A1* | 4/2010 | Bennett | G06Q 99/00 715/781 |
| 2010/0257610 A1* | 10/2010 | Hohl | G06F 21/51 726/25 |
| 2011/0029976 A1* | 2/2011 | Patey | G06F 9/5072 718/102 |
| 2013/0262090 A1* | 10/2013 | Xiong | G06F 17/2785 704/9 |
| 2015/0088815 A1* | 3/2015 | Billapati | G06F 17/30289 707/609 |
| 2015/0207665 A1* | 7/2015 | Basso | G06F 17/30345 709/223 |

\* cited by examiner

FIG. 4

| ANALYSIS ALGORITHM | DESCRIPTION |
|---|---|
| 1. VMS: NOT FIXED, TESTING: FIXED | DETECT VULNERABILITIES THAT ARE LABELED ACTIVE, BUT HAVE BEEN RESOLVED |
| 2. VMS: FIXED, TESTING: NOT FIXED | DETECT VULNERABILITIES THAT ARE LABELED RESOLVED, BUT ARE STILL ACTIVE |
| 3. VMS: NOT FIXED, TESTING: NOT FIXED | DETECT VULNERABILITIES THAT ARE CONFIRMED AS ACTIVE |
| 4. VMS: FIXED, TESTING: FIXED | DETECT VULNERABILITIES THAT ARE CONFIRMED RESOLVED |
| 5. VMS: NOT FIXED, NO TESTS IDENTIFIED | DETECT VULNERABILITIES THAT ARE LABELED ACTIVE, AND HAVE NOT BEEN CONFIRMED |
| 6. VMS: FIXED, NO TESTS IDENTIFIED | DETECT VULNERABILITIES THAT ARE LABELED RESOLVED, BUT HAVE NOT BEEN CONFIRMED |
| 7. VMS: IRRELEVANT, NO TESTS IDENTIFIED | DETECT VULNERABILITIES THAT ARE LABELED NOT APPLICABLE |
| 8. NEW INFORMATION | DETECT NEW VULNERABILITIES INDICATED IN NEW ALERTS |
| 9. TEST RESULTS NOT IN VMS | DETECT VULNERABILITIES THAT WERE REPORTED AFTER TESTING |

DIAGNOSING AND TRACKING PRODUCT VULNERABILITIES FOR TELECOMMUNICATION DEVICES VIA A DATABASE

FIELD OF THE INVENTION

The invention relates to the field of telecommunication computing devices (hereinafter, "telecom devices").

BACKGROUND

Security vulnerabilities may enable criminals to gain access to or otherwise disrupt the operations of operating telecom devices such as wireless base stations and servers. For example, a security vulnerability in a telecom device may enable a criminal to gain an enhanced level of permission for controlling the device, thereby enabling the criminal to spy on traffic flowing between the telecom device and other devices.

If appropriate countermeasures are not applied quickly and efficiently (e.g., in patches by product developers), criminals may for example take advantage of these weaknesses to steal customer information and cause substantial financial damage. Unaddressed security vulnerabilities may therefore result in a breach of trust with customers, making the customer base rapidly shrink. However, even though product developers are incentivized to address security vulnerabilities as soon as they are reported, the process for doing so remains complicated. For example, even when security vulnerabilities are detected, it may be a complicated process to determine what entities are responsible for addressing the security vulnerabilities, and to determine whether there are already plans in place to address those vulnerabilities in an upcoming release or patch.

This issue with coordinating the remediation or mitigation of security vulnerabilities for a product stems from the fact that vulnerability information may be indicated by sources that are unrelated to each other and do not communicate with each other. For example, a customer complaint may describe a security vulnerability, and a security alert from a trusted group of researchers may describe the same vulnerability using different language. This may cause multiple tickets for the same vulnerability to be generated for the product developers, causing the developers to unintentionally duplicate their efforts, which in turn reduces efficiency. Compounding the problem, each source of security vulnerability information may be located in a different branch of the company that develops the telecom device, or may even be located at entirely different companies. This means that communication and coordination between the potential sources of vulnerability information can be poor.

SUMMARY

Embodiments described herein retrieve security vulnerability information from multiple sources, and store the information in a single repository for reporting and retrieval. The repository may be indexed and searched by a user in order to identify and correlate related security vulnerabilities for a telecom device. Furthermore, test results from trusted/authoritative sources (e.g., a test and debug group for the telecom computing device) may be used to invalidate conflicting vulnerability information, ensuring that inaccurate data is invalidated before it misleads a product developer or customer service agent.

One embodiment is a system that tracks security vulnerabilities in product lines. The system includes a database and a controller. The database stores a plurality of entries, each entry describing at least one security vulnerability, wherein each security vulnerability enables exploitation of a defect on a telecommunication device. The controller receives input describing a class of telecommunication devices, and electronically searches the database to identify pertinent entries describing a relevant security vulnerability pertaining to the class. The controller is also able to identify an authoritative entry that describes the relevant security vulnerability, validate pertinent entries within the database that conform with the authoritative entry; and assess a severity of the relevant security vulnerability of the class based on the conforming entries.

In a further embodiment, the database stores entries that describe tests performed upon the product line for detecting the security vulnerability, entries that describe software development updates for the product line, entries that describe security alerts indicating how the security vulnerability provides unauthorized access to devices, and entries that describe customer feedback for the product line. The controller selectively invalidates entries in the database based on whether the entries conflict with test results, software development updates, security alerts, or customer feedback.

In a further embodiment, the controller invalidates entries for customer feedback that conflict with any of test results, software development updates, or security alerts. The controller also invalidates entries for security alerts that conflict with any of test results or software development updates. The controller also invalidates entries for software development updates that conflict with test results.

In a further embodiment, the pertinent entries include results of tests performed upon the class for detecting the relevant security vulnerability, and the controller is configured to selectively invalidate pertinent entries in the database that conflict with the results.

In a further embodiment, the database is configured to store multiple types of entries that each include different categories of information, and the controller is configured to selectively invalidate the pertinent entries in the database based on a ranking assigned to each type of entry.

In a further embodiment, the database stores at least one software development update, the at least one software development update indicating a patch for the class to address security vulnerabilities, and the controller is configured to report information related to the at least one software development update in a security vulnerability report.

In a further embodiment, each entry in the database includes multiple fields for storing data related to a security vulnerability, and the controller is configured to perform semantic analysis of the multiple fields to identify pertinent entries describing the relevant security vulnerability for the class.

In a further embodiment, the controller is configured to identify pertinent entries describing the relevant security vulnerability for the class by detecting entries that include a Common Vulnerabilities and Exposures (CVE) Identifier (ID) field, and by selecting entries for which the CVE ID field matches a CVE ID for the security vulnerability.

In a further embodiment, the controller is configured to identify pertinent entries describing the security vulnerability for the class by searching the database for entries that match at least one keyword associated with the relevant security vulnerability.

In a further embodiment, each of the security vulnerabilities enables exploitation of a defect on a telecommunication device to gain unauthorized access to the telecommunication device, to effect denials of service at the telecommunication device, to access information on the device without authorization, or to steal service provided by the telecommunication device.

Another embodiment is a method for managing security vulnerabilities for a product line. The method includes receiving input describing a class of telecommunication devices, identifying a database storing a plurality of entries that describe security vulnerabilities for the class, wherein each of the security vulnerabilities enables exploitation of a defect on a telecommunication device, and searching the database to identify pertinent entries describing a relevant security vulnerability for the class. The method also includes identifying an authoritative entry that describes the relevant security vulnerability, validating pertinent entries within the database that conform with the authoritative entry, and assessing a severity of the relevant security vulnerability based on the conforming entries.

Yet another embodiment includes a non-transitory computer readable medium embodying programmed instructions which, when executed by a processor, are operable for performing a method. The method includes receiving input describing a class of telecommunication devices, identifying a database storing a plurality of entries that describe security vulnerabilities for the class, wherein each of the security vulnerabilities enables exploitation of a defect on a telecommunication device, and searching the database to identify pertinent entries describing a relevant security vulnerability for the class. The method also includes identifying an authoritative entry that describes the relevant security vulnerability, validating pertinent entries within the database that conform with the authoritative entry, and assessing a severity of the relevant security vulnerability based on the conforming entries.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 4 is a table illustrating algorithms for detecting relationships between entries in a vulnerability database in an exemplary embodiment.

DETAILED DESCRIPTION

The figures and the following description illustrate specific exemplary embodiments of one or more inventions. It will thus be appreciated that those skilled in the art will be able to devise various arrangements that, although not explicitly described or shown herein, embody the principles of the disclosure and are included within the scope of the claimed invention(s). Furthermore, any examples described herein are intended to aid in understanding the principles of the disclosure, and are to be construed as being without limitation to such specifically recited examples and conditions. As a result, the claimed invention(s) is/are not limited to the specific embodiments or examples described below, but by the claims and their equivalents.

Figure 1:
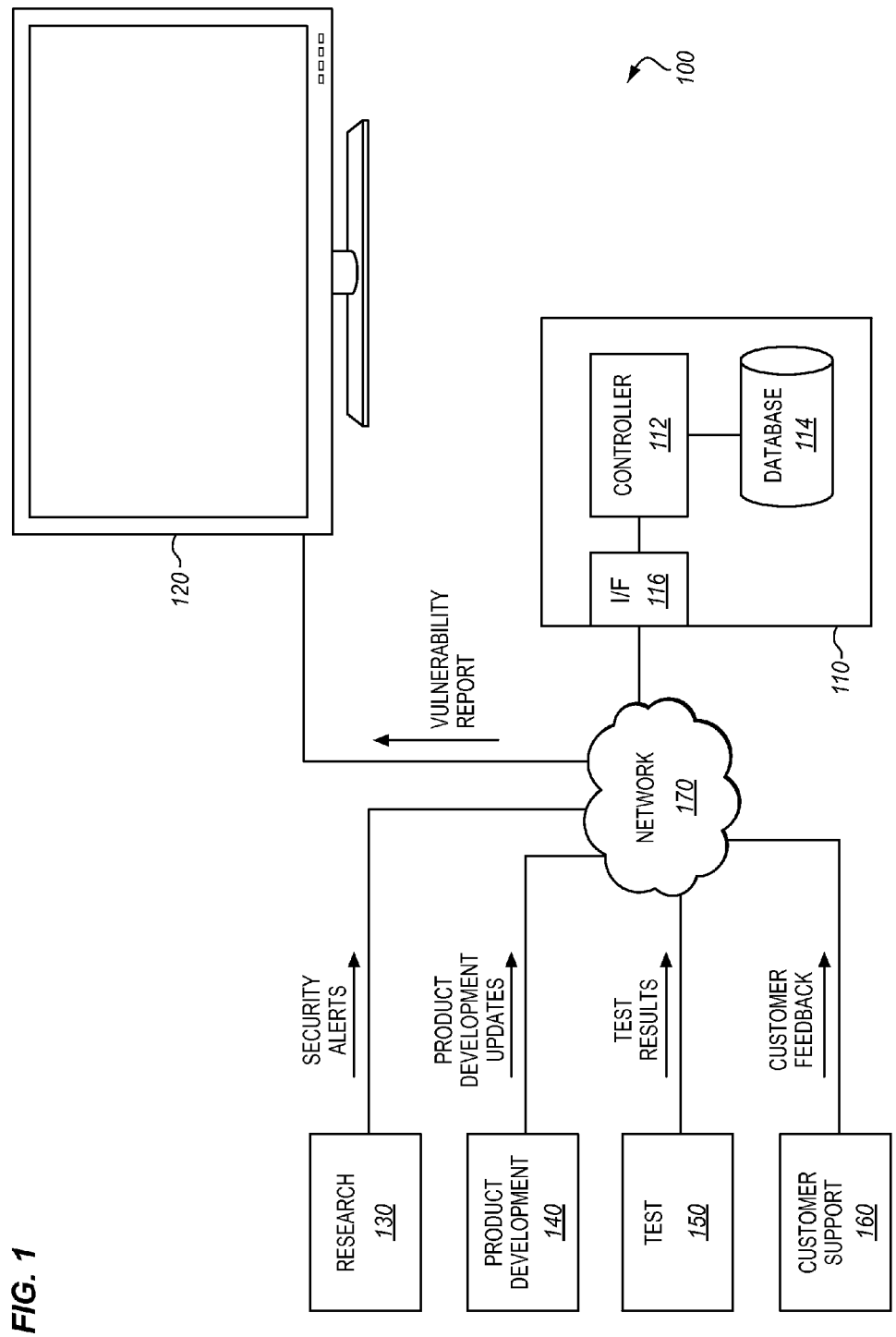
FIG. 1 is a block diagram of a vulnerability reporting system in an exemplary embodiment.

FIG. 1 is a block diagram of a Vulnerability Reporting System (VRS) 110 in an exemplary embodiment. VRS 110 is configured to retrieve information, from multiple sources, that describes potential security vulnerabilities for telecom devices, and to store the information in a centralized database for review. VRS 110 is further able to detect conflicting information between entries in the database, and to resolve these conflicts based on the source that originally provided each entry (e.g., based on a hierarchy of configurable authoritative sources). The various sources may be ranked in any suitable order, automatically or manually, based on user criteria/preferences (e.g., based on applying analytic algorithms weighing risk, reputation, and other vulnerability information variables). After resolving these conflicts, VRS 110 generates and transmits reports that indicate the current status of security vulnerabilities for a product line of telecom devices.

As used herein, a security vulnerability is a flaw that enables exploitation of a defect (e.g., a hardware and/or software configuration) on a telecom device, such as a flaw that enables unauthorized access and/or control of that telecom device. Access may include privileges for reading or writing to the telecom device, reprogramming the telecom device, or monitoring traffic (e.g., packets of data or voice traffic) passing through the telecom device. Unauthorized access is a level of access that goes beyond what is normally provided by the telecom device to the user. For example, a security vulnerability that maliciously provides root access to users who are not support technicians or owners of the device, may be considered to provide unauthorized access to the device. Another example of unauthorized access is when a user acquires a level of access that is higher than their user account settings allow. For example, if a user account is designed to provide read-only access, an exploit that provides the user account read and write access would provide unauthorized access. Further examples of security vulnerabilities include gaining unauthorized access, effecting denials of service, performing thefts of service, or enabling the acquisition, retrieval and/or disclosure of sensitive information such as user account numbers, dates of birth, full names, and/or social security numbers without authorization.

In this embodiment, VRS 110 comprises controller 112, database 114, and interface (I/F) 116. Controller 112 manages the overall operations of VRS 110, by operating I/F 116 to retrieve vulnerability information, by managing entries in database 114, and by dynamically preparing reports (e.g. for presentation via display 120, for emailing to a user, for saving to disk, etc.). Controller 112 may be implemented as custom circuitry, a processor executing programmed instructions stored in program memory, or some combination thereof. I/F 116 comprises any suitable interface for retrieving and transmitting data describing security vulnerabilities for telecom devices. For example, I/F 116 may comprise a wireless interface such as an interface compatible with Institute of Electrical and Electronics Engineers (IEEE) 802.11 protocols or cellular protocols, may comprise a wired Ethernet port, etc.

Requests sent from I/F 116 may include login credentials (e.g., a user name and password) for accessing reports stored on other systems. In response to receiving a request from I/F 116 via network 170 (e.g., an intranet or the Internet), these other systems provide vulnerability information to VRS 110. In this embodiment, VRS 110 receives information from a server 130 managed by an independent research group, a server 140 managed by a product development group, a server 150 managed by a test group 150, and a server 160 managed by a customer support group. Data from server 130 includes publications and security alerts from security researchers that describe newly detected vulnerabilities that may impact a wide range of products. Product development updates from server 140 indicate an expected development path for a telecom product, including if and when certain security vulnerabilities will be addressed. Test results from server 150 indicate the results of tests performed on specific versions of telecom devices, indicating whether the tests confirmed the presence (or absence) of one or more specific security vulnerabilities, and/or a severity of each security vulnerability. Customer feedback from server 160 indicates complaints from users of telecom devices, as well as symptoms reported by users that indicate the presence of one or more security vulnerabilities.

Controller 112 stores vulnerability information received via I/F 116 within database 114, and may maintain this data as entries in database 114 that match the original format of the reports as they were originally stored on their corresponding systems. Thus, in one embodiment, database 114 is implemented as a NoSQL database where incoming data is stored in its native format, instead of being translated into a new format specific to database 114. Database 114 is implemented by a physical memory of VRS 110, such as one or more hard disks or Solid State Drives (SSDs).

Based on the data stored in database 114, controller 112 generates reports that indicate the existence and/or severity of one or more security vulnerabilities with respect to a telecom product line. Controller 112 may provide these reports for viewing via display 120, or may print these reports or store them for later viewing. Display 120 may comprise a screen, projector, etc., for presenting digitally stored information.

Further details of the operation of VRS 110 will be discussed with regard to FIG. 2. Assume, for this embodiment, that database 114 includes multiple entries that each describe at least one security vulnerability for a telecom device. For example, database 114 may store tens or hundreds of thousands of entries that would be impossible for a human to parse.

Figure 2:
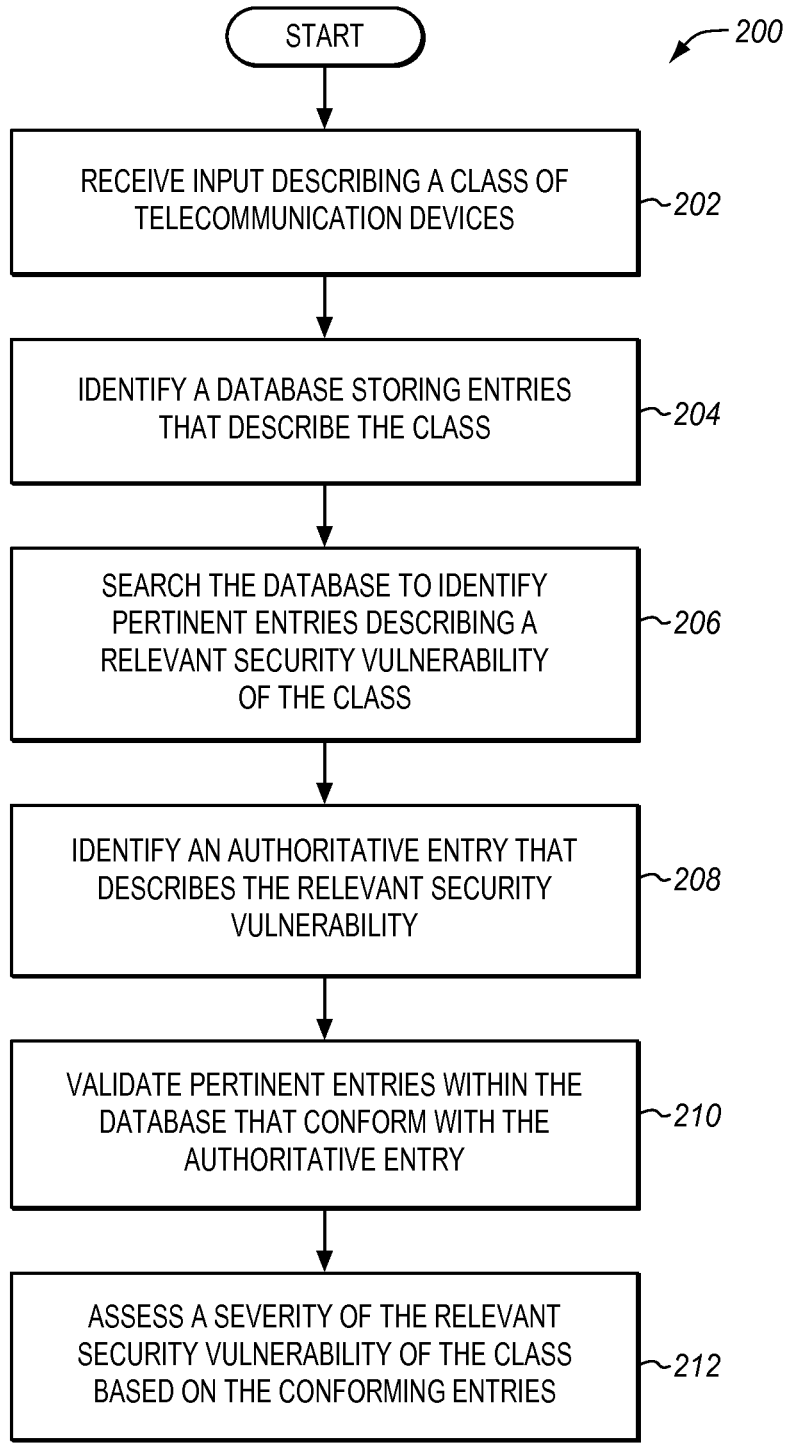
FIG. 2 is a flowchart illustrating a method for operating a vulnerability reporting system in an exemplary embodiment.

FIG. 2 is a flowchart illustrating a method 200 for operating a vulnerability reporting system in an exemplary embodiment. The steps of method 200 are described with reference to VRS 110 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, controller 112 receives input (e.g., from a user or based on programmed criteria) selecting a class (e.g., product line) of telecom devices. As used herein, a single "telecom device" is a specific electronic telecommunication apparatus, such as a single cellular phone or base station. Meanwhile, a "class" of telecom devices refers to a group/series of telecom devices that utilize the same components and/or software, and may be associated with the same brand or product name. For example, the set of phones that are each manufactured and sold as a "Samsung Galaxy 6" may comprise a class. A user may select a class or set of classes, and may do so based on an internal name for the product line, a brand name by which the product line is sold to customers, or any other suitable metric. The user may also select a security vulnerability. If no vulnerability is selected, all vulnerabilities for the selected product line or set of product lines may be processed. Similarly, a list of vulnerabilities can be provided by the user, and each vulnerability in the list may be processed. For example, the user's input may describe a security vulnerability for analysis by using one or more keywords, or by citing to a Common Vulnerabilities and Exposures (CVE) Identifier (ID) number listed on the US National Vulnerability Database.

In step 204, controller 112 identifies database 114, which stores entries that describe the class, as well as relevant security vulnerabilities for the class. This may comprise loading all or a portion of database 114 into a low-latency, high bandwidth memory such as Random Access Memory (RAM), determining a location of database 114 in the file system, etc. In one embodiment, a separate database is used to store data for each product line or each security vulnerability, and controller 112 selects the database that stores data for the selected product line and/or vulnerability.

In step 206, controller 112 searches database 114 to identify pertinent entries describing a relevant security vulnerability for the class. There may be hundreds of thousands, or even millions of entries within database 114 describing a variety of product lines and security vulnerabilities. Controller 112 may therefore scan through the entries of database 114 in search of entries that match keywords for the class and a relevant security vulnerability. Entries that describe the relevant security vulnerability may be identified based on any suitable correlating information within one or more of their fields, such as CVE ID, Common Weakness Enumeration (CWE) ID, Common Platform Enumeration (CPE) ID, a plugin identifier, labels, key words, a generic Vulnerability Enumeration Identifier (VE ID), etc. For example, if an entry includes a field for CVE ID number, and the field has a value that matches a user's search request, the entry may be associated with the requested vulnerability.

In a further embodiment, controller 112 performs a multi-stage filtering process, where a first search quickly identifies entries that exactly match a keyword for the product line and a CVE ID number for the vulnerability. Then controller 112 performs a second search by engaging in processing intensive semantic analysis for each entry in database 114 to identify additional entries that are associated with both the product line(s) and the relevant vulnerability.

In step 208, controller 112 identifies an authoritative entry in database 114 (e.g., an entry that describes a test performed upon the class(es) for detecting the relevant security vulnerability such as an entry describing the results of a test performed by a test group). The authoritative entry may for example be flagged at the database as being received from a trusted/authoritative source, or may be flagged as an authoritative source based on user preferences, credentials and/or access privileges. The authoritative entry may conclusively confirm or deny the existence of the security vulnerability within the product line. When the entry has been identified, it may be used to validate and/or invalidate other entries that describe the security vulnerability for the product line. Controller 112 may even detect multiple entries that are authoritative.

In further embodiments, controller 112 may be configured with a hierarchy of authoritative sources, or the hierarchy may be algorithmically determined. For instance, a source may be authoritative for one search, but not the other. Controller 112 may identify authoritative entries based on user-configurable preferences concerning sources, ranging from pre-defined rankings to applying analytic algorithms weighing risk, reputation, and other vulnerability information variables. For example, each source for an entry may be associated with one or more characteristics indicating trustworthiness or importance, such as the level of media/publicity exposure for that source, the integrity/fallibility/reputation of that source, the repeatability of results from that source, etc., and each of these characteristics may be assigned a programmable, adjustable weight. Based on the combination of characteristics and weights, one or more authoritative entries may be identified and/or ranked in order of importance. In a further embodiment, controller 112 determines a confidence factor for entries from different sources for the security vulnerability. This confidence factor may vary depending on the particular security vulnerability. For example, for one security vulnerability, test results may be authoritative, while for another security vulnerability, product development reports may be authoritative.

In step 210, controller 112 validates entries within the database that conform with the authoritative entry identified in step 208, which may involve invalidating entries that conflict with the authoritative entry. As used herein, an entry that conflicts with an authoritative entry (e.g., the results of a test) directly contradicts the information stored in the authoritative entry. In contrast, an entry that conforms with an authoritative entry does not contradict information stored in the authoritative entry. For example, customer feedback may indicate that a relevant security vulnerability exists in the product line, while test results may indicate that a relevant security vulnerability does not exist in the product line. Controller 112 may therefore invalidate the entry for the conflicting customer feedback, marking it with a tag in database 114 as "untrue," "invalid," or "rejected," and indicating a link/identifier for the source that invalidated the entry. Similarly, a product development update may indicate that a security vulnerability was fixed in the most recent patch, while the results of a test performed after the patch was applied may indicate that the security vulnerability still exists. Therefore, controller 112 may invalidate the entry for the product development update as being inaccurate. Controller 112 may further store a set of configurable heuristic rules in memory indicating which combinations of fields and values indicate conflicts between the entries of database 114.

In step 212, controller 112 assesses a severity of the relevant security vulnerability of the class based on the conforming entries. For example, controller 112 may generate a report indicating a severity of the relevant security vulnerability within the class/product line, based on the remaining valid entries within the database for the product line and security vulnerability. The severity of the security vulnerability within the product line may be reported as explicitly indicated in one of the remaining valid entries. For example, a publication from a research group or product development group may indicate that the vulnerability is trivial, minor, moderate, or severe (depending on the unauthorized level of access permitted by the vulnerability, or the potential for accessing valuable information). In one embodiment, the severity of the reported security vulnerability is determined by an algorithm that takes into account the severity assigned by each source of vulnerability information, the amount of publicity/exposure existing for the vulnerability, user input, impacts on other product lines, etc.

Controller 112 may generate the report by including information from the valid entries, and sorting the information in order of importance based on the source of the information (e.g., the testing group, product development group, a research group, or a customer). In step 214, controller 112 operates I/F 116 to provide the report to the user (e.g., in an electronic format, or by printing or saving the report to disk). The information in the report may then be used to indicate whether to update the product line of telecom devices to address the security vulnerability. That is, based on the severity of the vulnerability indicated in the report, a user may flag the product line for patching. In a further embodiment, controller 112 may add a "security posture score" for the products) in the report. For example, controller 112 may utilize an algorithm that takes into account the number of open vulnerabilities, the severities, and/or media exposure/publicity of each of those vulnerabilities in order to derive the security posture score for the product. This score may help users to rank the security of various products with respect to each other, which may be particularly useful for review by decision makers such as company compliance officers or security officers (e.g. the Chief Information Security Officer).

Using method 200 as described above, an automated and dynamic system of vulnerability tracking and management may be implemented for telecom devices, even in environments where new entries are being added to database 114 by the thousands on a daily basis. Method 200 ensures that disparate sources of information for security vulnerabilities may be utilized, that conflicting information may be selectively invalidated/resolved, and that the various types of information may be compiled into useful reports, even if those disparate sources of information never communicate with each other and are conflicting in nature. This ensures that even in environments where test groups, product development groups, and customer support centers are separated by physical, electronic, and/or hierarchical barriers, vulnerabilities may be quickly identified and resolved.

In a further embodiment, entries in database 114 that were received from different sources are provided with different levels of authority for invalidating other entries. For example, controller 112 may be configured to selectively invalidate entries in the database based on whether the entries conflict with test results, software development updates, security alerts, or customer feedback based on user preferences/rules defined for a vulnerability reporting system. In such an environment, test results from a testing group may be given the highest level of authority, product development updates from a product development group may be given the next highest level of authority, security alerts from a research group may be given the third highest level of authority, and customer feedback may be assigned the lowest level of priority. Controller 112 may therefore invalidate entries for customer feedback that conflict with any of test results, software development updates, or security alerts, may invalidate entries for security alerts that conflict with any of test results or software development updates, and may invalidate entries for software development updates that conflict with test results. This provides a user-configurable, hierarchical, source-based technique for selectively detecting invalid information within database 114.

Examples

In the following examples, additional processes, systems, and methods are described in the context of a Vulnerability Reporting System (VRS) for telecom devices.

In this example, a user has decided that they wish to review the status of a bug known as "Goto Fail" for a product line of cellular phones. Therefore, the user operates a Graphical User Interface (GUI) to access the VRS, and provides input by typing in the name of the product line, as well as a CVE ID number for the "Goto Fail" bug (CVE-2014-1266). A controller of the vulnerability system then identifies a database that stores data for the product line, and analyzes entries within the database to identify entries that match the user's search criteria.

Figure 3:
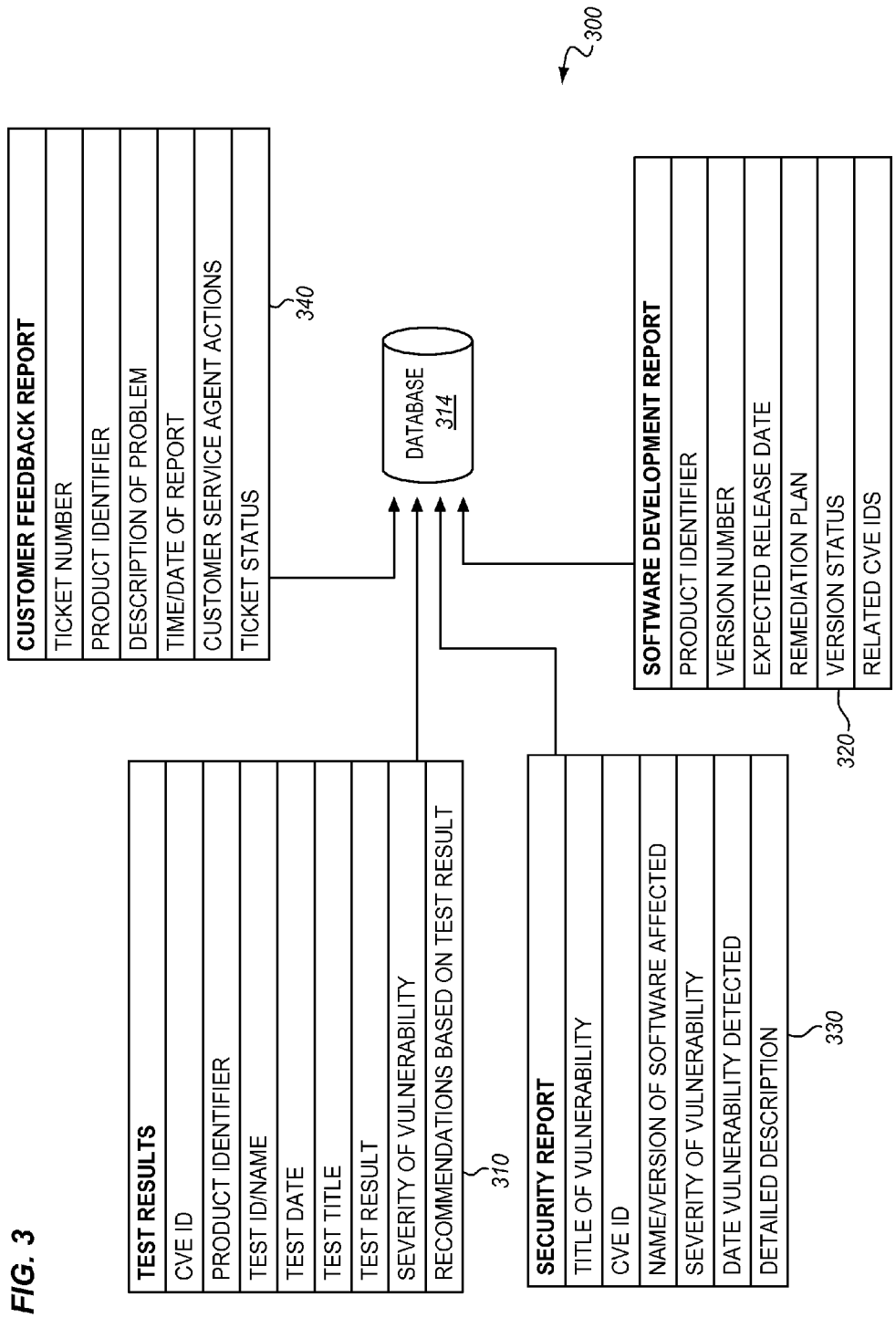
FIG. 3 is a diagram illustrating various types of entries in a vulnerability database in an exemplary embodiment.

FIG. 3 is a diagram 300 illustrating various types of entries stored in the database used in this example. According to diagram 300, database 314, stored in memory on an SSD, maintains four different types of entries. Each type of entry includes a different set of fields for storing data, and each type of entry has originated from a different source of information. The first type of entry, shown at element 310, describes the results of tests performed on a telecom device of a product line. This type of entry includes a correlation field for linking the entry to other entries (in this case, CVE ID number), a product identifier indicating the tested product line, a unique identifier for the test that was performed, the title of the test, a date the test was performed, a result of the test (e.g., pass/fail with respect to the vulnerability), a severity of the vulnerability determined based on the test, and a textual analysis indicating recommendations based on the results of the test.

The second type of entry, shown at element 320, describes a software development update prepared by a product development group. This type of entry includes a product identifier indicating the product line being updated, a version number for the update, an expected or actual release date of the update, a remediation plan detailing changes applied by the update (e.g., whether or not a security vulnerability will be resolved in the update), a version status indicating whether the update has been applied or not, and a list of CVE ID numbers that are related to the update. Each software development update therefore indicates patches that will be applied to the product line to address one or more security vulnerabilities.

The third type of entry, shown at element 330, describes a security alert prepared by an independent research group. This type of entry includes a title for the vulnerability, a CVE ID number for the vulnerability, a name and/or version of software packages and/or libraries impacted by the vulnerability (e.g., Java, Adobe Acrobat, Structured Query Language (SQL), etc.), a severity of the vulnerability (e.g., as determined by an algorithm that takes into account the severity assigned by each source of vulnerability information, user input, other product lines, etc.), a date the vulnerability was detected, and a detailed textual description of the vulnerability.

The fourth type of entry, shown at element 340, describes customer feedback prepared by a customer service agent in response to being contacted by a customer or user of a telecom device. This type of entry includes a support ticket number uniquely distinguishing the report from other customer feedback, a product line and/or version number related to the customer feedback, a description of the problems encountered with the product line, a time/date the report was received, and a list of actions taken by the customer service agent to identify and/or address the problem. The report also includes a ticket status indicating whether the problem was eventually resolved to the satisfaction of the customer.

These four different types of entries are all analyzed by the controller of the VRS in order to identify entries that describe both the cellular phone product line and the Goto Fail security vulnerability indicated by the user. Entries for the vulnerability are detected based on whether they list the CVE ID number for the vulnerability. If an entry does not include a field for CVE ID number, its textual fields are analyzed to determine whether they include keywords correlated with the vulnerability. Entries for the product line are selected based on whether they match the product identifier(s) for the product line. If the entries do not include a field for product identifier(s), then their textual fields are analyzed to determine whether they include keywords correlated with the product line.

Once a set of entries has been identified that relate to both the cellular phone product line and the Goto Fail vulnerability, the controller of the VRS classifies the entries of the set based on their source (e.g., in order to identify entries that describe tests performed on the product line). This may be performed based on user preferences of source ranking, or based on an analytic algorithm that classifies the entries of the set based a configurable hierarchy of authoritative sources. The controller of the VRS also activates one or more correlation algorithms to engage in conflict resolution between different entries, and/or to flag certain entries for further analysis. FIG. 4 is a table 400 illustrating algorithms for analyzing entries in a vulnerability database in an exemplary embodiment. According to FIG. 4, the database includes security alerts sourced from a "Vulnerability Management System" (VMS), which operates as a repository describing publicly identified vulnerabilities for a variety of products. Each alert in the VMS details a vulnerability detected in a software package or library that may be used in one or more product lines. Thus, some alerts from the VMS may correspond with actual vulnerabilities of a telecom device, while others may not (e.g., because the library or package, as used in the telecom device, has already been modified in such a manner that the vulnerability does not exist). As such, alerts from the VMS benefit from validation via one or more tests.

Since each of the entries in the database includes multiple fields for storing data related to the security vulnerability, the controller performs semantic analysis upon the fields of the entries to identify entries describing the security vulnerability for the product line. The first algorithm in table 400 detects when an alert indicates that a vulnerability has not been addressed, but a test indicates that the vulnerability has been fixed. This may then be reported and displayed to a user via a window, included in a report, or stored to disk as desired, and conflicts may be resolved by invalidating the alert(s) that conflict with the test results. The second algorithm detects when an alert indicates that a vulnerability has been addressed, but a test indicates that the vulnerability has not been fixed. This may then be reported and displayed to a user via a window, included in a report, or stored to disk as desired, and conflicts may be resolved by invalidating the alert(s) that conflict with the test results.

The third and fourth algorithm both detect situations where alerts from the VMS and test reports both agree that a security vulnerability has or has not been resolved. In the fifth through seventh algorithms, no tests have been detected for the reported vulnerability. The fifth and sixth algorithms therefore indicate a potential need for performing a test to validate alerts from the VMS, while the seventh algorithm deprecates the need for a test by marking the vulnerability as not applicable to the device. The seventh algorithm may detect vulnerabilities that are not applicable based on software name/version data or the detailed description provided in the detected alerts.

The eighth algorithm identifies vulnerabilities contained in VMS alerts that were created after the testing was performed. In this case, there is no test data to correlate with the VMS alert. In the ninth algorithm, the controller identifies vulnerabilities which tests have found, but are not included in alerts from the VMS After identifying and resolving any conflicts between the entries, the controller generates a report indicating the severity of the Goto Fail bug for the cellular phone line. The report is a compiled list of data, sorted based on the date the data was received and the source that provided the data. The report indicates the known information about the bug with respect to the product line. In the case of multiple product lines/severities, the report can be sorted in other ways, such as by product line, by severity, etc. The report is transmitted for presentation via a display such as a monitor or screen. It can also be printed, or saved to disk as desired.

Figure 5:
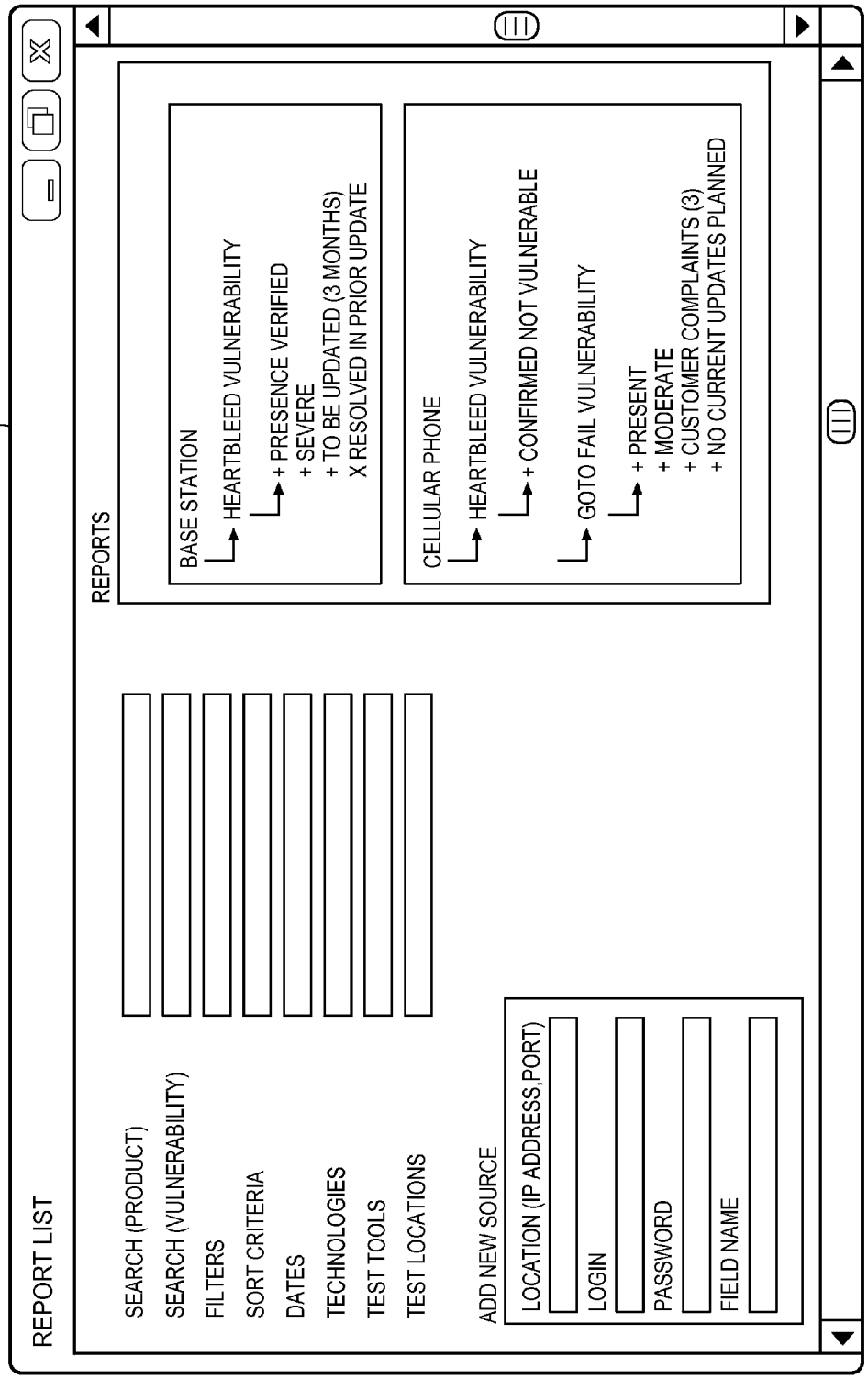
FIG. 5 is a diagram illustrating a window for reporting security vulnerabilities in an exemplary embodiment.

FIG. 5 is a diagram illustrating a window 500 for reporting security vulnerabilities in an exemplary embodiment. In FIG. 5, a variety of user input options enable a user to add a new source to a database of security vulnerabilities (e.g., enabling the vulnerability system to pull more entries into its database via a new source). Furthermore, window 500 provides a set of search inputs for identifying specific telecom product lines and/or vulnerabilities within the database, specific dates, test tools and locations, technologies involved, etc. Individual reports are illustrated for different products lines (e.g., base station, cellular phone), and each report includes a list of validated data (indicated with a "+") and invalidated data (indicated with an "X").

Any of the various elements shown in the figures or described herein may be implemented as hardware, software, firmware, or some combination of these. For example, an element may be implemented as dedicated hardware. Dedicated hardware elements may be referred to as "processors," "controllers," or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:
a database configured to store a plurality of entries describing security vulnerabilities that enable unauthorized control of telecommunication devices; and
a controller configured to receive input describing a class of telecommunication devices that each utilize the same software and hardware, and identifies a security vulnerability;
the controller being further configured to identify an authoritative entry in the database that describes the security vulnerability, and electronically search the database to identify entries that each describe both the security vulnerability and the class, and
for each identified entry in the database, add a tag to the entry indicating a conflict on the condition that information in the entry directly contradicts information in the authoritative entry,
wherein the authoritative entry and the identified entries exist within the same database;
wherein:
the entries include results of tests performed upon the class for detecting the security vulnerability, and
the controller is configured to selectively invalidate entries in the database that conflict with the results.

2. The system of claim 1, wherein:
the database is configured to store multiple types of entries that each include different categories of information, and
the controller is configured to selectively invalidate the entries in the database based on a ranking assigned to each type of entry.

3. The system of claim 1, wherein:
the database stores at least one software development update, the at least one software development update indicating a patch for the class to address security vulnerabilities, and
the controller is configured to report information related to the at least one software development update in a security vulnerability report.

4. The system of claim 1, wherein:
each entry in the database includes multiple fields for storing data related to a security vulnerability, and
the controller is configured to perform semantic analysis of the multiple fields to identify entries describing both the security vulnerability and the class.

5. The system of claim 1, wherein:
the controller is configured to identify entries describing the security vulnerability by detecting entries that include a Common Vulnerabilities and Exposures (CVE) Identifier (ID) field, and by selecting entries for which the CVE ID field matches a CVE ID for the security vulnerability.

6. The system of claim 1, wherein:
the controller is configured to identify entries describing the security vulnerability by searching the database for entries that match at least one keyword associated with the security vulnerability.

7. The system of claim 1, wherein:
each of the security vulnerabilities enables exploitation of a defect on a telecommunication device to gain unauthorized access to the telecommunication device, to effect denials of service at the telecommunication device, to access information on the device without authorization, or to steal service provided by the telecommunication device.

8. A method comprising:
receiving input describing a class of telecommunication devices that each utilize the same software and hardware;

identifying a database storing a plurality of entries describing security vulnerabilities that enable unauthorized control of telecommunication devices;

identifying a security vulnerability:

identifying an authoritative entry in the database that describes the security vulnerability; and electronically searching the database to identify entries that each describe both the security vulnerability and the class, and for each identified entry in the database, adding a tag to the entry indicating a conflict on the condition that information in the entry directly contradicts information in the authoritative entry, wherein the authoritative entry and the identified entries exist within the same database;

wherein:

the entries include results of tests performed upon the class for detecting the security vulnerability, and the method further comprises selectively invalidating entries in the database that conflict with the results.

9. The method of claim 8, wherein:

the database stores multiple types of entries that each include different categories of information, and the method further comprises:

selectively invalidating the entries in the database based on a ranking assigned to each type of entry.

10. The method of claim 8, wherein:

the entries include at least one software development update, the at least one software development update indicating a patch for the class to address security vulnerabilities, and the method further comprises:

reporting information related to the at least one software development update in a security vulnerability report.

11. The method of claim 8, wherein:

each of the entries in the database includes multiple fields for storing data related to a security vulnerability, and the method further comprises:

performing semantic analysis upon the fields of the multiple fields to identify entries describing the security vulnerability for the class.

12. The method of claim 8, further comprising:

identifying entries describing the security vulnerability for the class by detecting entries that include a Common Vulnerabilities and Exposures (CVE) Identifier (ID) field; and selecting entries for which the CVE ID field matches a CVE ID for the security vulnerability.

13. The method of claim 8, wherein:

the entries include results of tests performed upon the class for detecting the security vulnerability, and the results of the test indicate a presence and a severity of a security vulnerability with respect to the class.

14. The method of claim 8, wherein:

each of the security vulnerabilities enables exploitation of a defect on a telecommunication device to gain unauthorized access to the telecommunication device, to effect denials of service at the telecommunication device, access information on the device without authorization, or to steal service provided by the telecommunication device.

15. A non-transitory computer readable medium embodying programmed instructions which, when executed by a processor, are operable for directing the processor to perform a method comprising:

receiving input describing a class of telecommunication devices that each utilize the same software and hardware:

identifying a database storing a plurality of entries describing security vulnerabilities that enable unauthorized control of telecommunication devices;

identifying a security vulnerability:

identifying an authoritative entry in the database that describes the security vulnerability; and electronically searching the database to identify entries that each describe both the security vulnerability and the class, and for each identified entry in the database, adding a tag to the entry indicating a conflict on the condition that information in the entry directly contradicts information in the authoritative entry, wherein the authoritative entry and the identified entries exist within the same database;

wherein:

the entries include results of tests performed upon the class for detecting the security vulnerability, and the method further comprises selectively invalidating entries in the database that conflict with the results.

16. The medium of claim 15, wherein the method further comprises:

selectively invalidating the entries in the database based on a ranking assigned to each type of entry.

17. The medium of claim 15, wherein:

the database stores multiple types of entries that each include different categories of information, and the method further comprises:

selectively invalidating the entries in the database based on a ranking assigned to each type of entry.

* * * * *